(12) United States Patent
Rollins et al.

(10) Patent No.: US 9,588,955 B2
(45) Date of Patent: Mar. 7, 2017

(54) SYSTEMS, METHODS, AND SOFTWARE FOR MANUSCRIPT RECOMMENDATIONS AND SUBMISSIONS

(71) Applicants: Jason Rollins, San Francisco, CA (US); Ellen Rotenberg, Philadelphia, PA (US); Enav Weinreb, Petah Tikva (IL); Hassan H. Malik, Monmouth Junction, NJ (US); Shai Hertz, Tel Aviv (IL)

(72) Inventors: Jason Rollins, San Francisco, CA (US); Ellen Rotenberg, Philadelphia, PA (US); Enav Weinreb, Petah Tikva (IL); Hassan H. Malik, Monmouth Junction, NJ (US); Shai Hertz, Tel Aviv (IL)

( * ) Notice: Subject to any disclaimer, the term of this patent is extended or adjusted under 35 U.S.C. 154(b) by 603 days.

(21) Appl. No.: 14/028,120

(22) Filed: Sep. 16, 2013

(65) Prior Publication Data

US 2015/0082156 A1    Mar. 19, 2015

(51) Int. Cl.
*G06F 17/22* (2006.01)
*G06F 17/27* (2006.01)
*G06F 17/24* (2006.01)

(52) U.S. Cl.
CPC .......... *G06F 17/2705* (2013.01); *G06F 17/27* (2013.01)

(58) Field of Classification Search
CPC .................................................. G06F 17/2705
USPC .......................................................... 715/225
See application file for complete search history.

(56) References Cited

U.S. PATENT DOCUMENTS

| | | | | |
|---|---|---|---|---|
| 8,626,835 | B1* | 1/2014 | Gyongyi | G06F 17/30598 709/204 |
| 2011/0060761 | A1* | 3/2011 | Fouts | G06F 17/21 707/770 |
| 2012/0072422 | A1* | 3/2012 | Rollins | G06F 17/2745 707/737 |
| 2014/0006424 | A1* | 1/2014 | Al-Kofahi | G06F 17/30 707/754 |

* cited by examiner

*Primary Examiner* — James J Debrow
(74) *Attorney, Agent, or Firm* — Duncan Galloway Egan Greenwald, PLLC; Kevin T. Duncan

(57) ABSTRACT

A multi-component software system facility matches unpublished academic manuscripts with a list or set of recommended potential "best fit" publications, e.g., journals, e.g., those publications determined most likely to accept the manuscript for publication. Upon selecting from a set of recommended publications a user may electronically upload or submit or transmit the unpublished article or work or manuscript to a target publication review and editing system. The present invention provides a client or web-based interface to effectively integrate word processor and bibliographic management software and other resources, including third-party authority databases.

16 Claims, 10 Drawing Sheets

SYSTEMS, METHODS, AND SOFTWARE FOR MANUSCRIPT RECOMMENDATIONS AND SUBMISSIONS

FIELD OF THE INVENTION

The invention described in this patent application comprises a multi-component software system that facilities the matching of unpublished academic manuscripts with a list of recommended potential "best fit" journals most likely to accept the manuscript for publication and the actual submission of the manuscript to a target journal review and editing system. The present invention is integrated with word processor and bibliographic management software and is connected to authority databases.

BACKGROUND OF THE INVENTION

Professionals, academics, researchers and others involved in writing academic or research papers or other manuscripts are constantly faced with the time consuming and complicated task of finding a journal or other publishing entity that will publish their manuscript. The task of finding the right source for publication involves identifying and compiling a list of possible journals, determining which may be best suited for the particular article or research, and then submitting the manuscript to the journal for consideration.

An individual author faced with this task may not have adequate resources available to compile a list of possible journals, may not have the time necessary to do so, or may be working with old or outdated information. The individual author also probably does not have more detailed information, such as the likelihood that a particular journal will publish his or her manuscript, or what topics are currently more likely to be published. An individual author would also not have the ability to easily send his or her manuscript to multiple journals for consideration without considerable extra effort.

As used herein, the terms article, work, manuscript, and paper are used interchangeably to refer to the work of an author intended for submission and publication. Also as used herein, journal, publisher, and publication are used interchangeably to refer to a publishing entity, whether electronic or hard "paper" publication, involved in soliciting and/or receiving papers or other works from authors for publication—for example publication in a journal or transaction. Such articles or works include but are not limited to research papers on a topic of particular interest, such as technical papers, medical research papers, legal research papers, etc., and are often involved in peer review proceedings. These works may also include bibliographies, or lists of citations, that reference other works or manuscripts cited to by the author. These bibliographies may be in a commonly accepted format and may also be created by scanning a manuscript for citations and generating a list of the citations that may be automatically managed and updated. Problems often encountered by authors involved in research and publication is that research is distributed among many institutions, both private and public, and historically there exists a logistical disconnect separating the authors and the publishing entities. Information sources and other collections of information exist that may help an author identify a journal or other publication suited to publish his or her manuscript. However, these sources of information may not be readily available and do not analyze an author's manuscript to provide suggestions and analysis tailored to the particular author and the particular manuscript. The widespread use of computers, databases, and large scale electronic media and storage of electronic data has resulted in a vast ocean of data. Such data may be very helpful to researchers attempting to identify publishers well-suited to publish research papers and other works. One problem is that the data is not readily usable to an individual author or if it is available it would be unmanageable and require considerable amounts of time to wade through. An author using the available sources of information would be required to manually parse the available data to match his or her manuscript with a journal or other publication suited for the particular manuscript. This task is tedious and time consuming and expends effort that the author could exert on performing additional research or on writing or editing manuscripts.

What is needed is a system that is integrated into an author's word processing software that analyzes a manuscript and the manuscript's bibliography to determine which journals or other publications would be best suited to publish the manuscript. Also, the system would need to be able to inform the individual author of the likelihood of publication with any particular journal and would need to be able to provide the author with detailed information on past published articles, topics of interest, other similar authors.

SUMMARY OF THE INVENTION

To address the shortcomings of existing systems and to satisfy the present and long felt need of the marketplace, the present invention provides a system integrated into software such as word processing software adapted to harmonize bibliographic software with the process of submitting a paper for publication. More specifically, a software program with a recommendation module serves to analyze an unpublished manuscript written by an author using bibliographic software, e.g., Thomson Reuters EndNote®. There are known methods for analyzing manuscripts or other documents to identify and process citations. For example, U.S. Pat. No. 8,082,214, issued Dec. 20, 2011, and entitled SYSTEM AND METHOD FOR CITATION PROCESSING, PRESENTATION AND TRANSPORT; U.S. patent application Ser. No. 13/327,399, filed Dec. 15, 2011, and entitled SYSTEM AND METHOD FOR CITATION PROCESSING, PRESENTATION AND TRANSPORT, which is a continuation of U.S. Pat. No. 8,082,214; U.S. patent application Ser. No. 13/161,438, filed Jun. 15, 2011, and entitled SYSTEM AND METHOD FOR CITATION PROCESSING, PRESENTATION AND TRANSPORT AND FOR VALIDATING REFERENCES, which is a continuation of U.S. Pat. No. 8,082,214 and is a continuation-in-part of U.S. patent application Ser. No. 11/820,842, filed Jun. 21, 2007; and U.S. patent application Ser. No. 13/539,280, filed Jun. 29, 2013, and entitled SYSTEMS, METHODS, AND SOFTWARE FOR PROCESSING, PRESENTING, AND RECOMMENDING CITATIONS, describe systems and methods for automatically processing one or more citations contained within a document while the document is presented by a document rendering application for presentation to a user and for selectively including citation data within a document rendering application, all of which are incorporated herein by reference. The software program recommends a set of at least one "best fit" publication or journal to which the author is to submit the unpublished manuscript for publication consideration. The analysis is based at least in part upon the unpublished manuscript's bibliography. The recommendation program may be integrated into bibliographic software and incorporated into word processing software. The recommendation program may also be used independently of either word processing software or bibliographic software to analyze a manuscript to determine at least one "best fit" journal or a set of ranked journals.

The present invention may comprise a multi-component system that facilitates the matching of academic manuscripts with at least one journal from a list of recommended potential "best fit" journals most likely to accept the manuscript for publication. The present invention also facilitates the actual submission of the manuscript to the review and editing system of a journal from the list of recommended journals.

The management and submission of manuscripts to a journal or publication may be accomplished using a service such as Thomson Reuters ScholarOne Manuscripts™. ScholarOne provides comprehensive workflow management systems for scholarly journals, books, and conferences. ScholarOne provides web-based applications that enable publishers to manage the submission, peer review, production, and publication processes more efficiently, increasing their profile among authors, decreasing time-to-market for critical scientific data, and lowering infrastructure costs. ScholarOne offers workflow solutions for the submission and review of manuscripts, abstracts, proceedings, books, grants & awards and production. ScholarOne includes over 365 societies and publishers, over 3400 books and journals.

In one embodiment the present invention is integrated into word processing and bibliographic management software. In this embodiment the invention comprises a word processor, a bibliographic or full text "authority" database, bibliographic or reference management software, a recommendation module, an academic manuscript submission module, and an author connection network module. An author would use the present invention to draft the academic manuscript, create and manage a bibliography, analyze the manuscript to determine at least one "best fit" journal, and submit the manuscript to the journal's review and editing system for consideration. The author would also be able to use the present invention to connect to other authors working on similar manuscripts in the same or similar fields of study.

In this embodiment, the present invention matches an academic manuscript to a journal most likely to accept the manuscript for publication by analyzing the manuscript's bibliography. The present invention analyzes jargon used in the manuscript, identifies and determines citation patterns in the manuscript, and uses this information to match the manuscript to one or more journals. The present invention may also use a set of rejected manuscripts to determine which journals are least likely to accept the academic manuscript for publication. The author may also be presented with supporting evidence for the list of journals determined to be the ones that "best fit" the author and academic manuscript. The supporting information may also include one or more "ranks" or "scores" assigned to each journal in the list of recommended journals to help the author determine which journal would be best suited for the manuscript. An author may also see the likelihood that the particular manuscript will be accepted by any journal from the list of recommended journals.

In one embodiment, the present invention may comprise a method implemented on a computer comprising a memory, a processor, and a program stored in the memory, the method for making publisher recommendations and comprising: accessing from the memory a word processing module for execution by the processor; initializing the program via the word processing module, the program executed by the processor and comprising a bibliographic software module and a recommendation sub-module, the initializing permitting interaction among the bibliographic software module, the recommendation sub-module and the word processing module; and invoking the recommendation sub-module to automatically generate a set of at least one recommendation as to a publication to which to submit an unpublished article for publication consideration, the recommendation based upon an analysis of a set of information associated with the unpublished article; storing the recommendation in the memory; and transmitting a file associated with the unpublished article to an electronic repository associated with at least one publication from the set of at least one publication. The set of information may further comprise one or more of a bibliography, an impact factor, a journal rank, a list of similar articles, an overall score, or a set of data relating to a set of rejected manuscripts of the journal. The overall score may be a match probability that is a composite score determined using both a nearest neighbor and fingerprint model. The set of information about the journal to which to submit the unpublished article may be presented via a display. The method may also further comprise generating an author connection graph.

In another embodiment, the present invention may comprise a system comprising a computer, the computer comprising a memory, a processor, and a program, the program stored in the memory and executable by the processor, the system comprising: means for processing an electronic document representing an unpublished article; means for analyzing a set of information associated with the unpublished article, the set of information associated with the unpublished article, the means for analyzing being part of the program; means, responsive to the means for analyzing, for making a recommendation as to a set of at least one publication to which to submit the unpublished article for publication consideration; means for transmitting the recommendation; means for receiving a response to the recommendation; and means, responsive to the means for receiving the response, for acting in accordance with the response. The set of information may further comprise one or more of a bibliography, an impact factor, a journal rank, a list of similar articles, an overall score, or a set of data relating to a set of rejected manuscripts of the journal. The overall score may be a match probability that is a composite score determined using both a nearest neighbor and fingerprint model. The set of information about the journal to which to submit the unpublished article may be presented via a display. The method may also further comprise generating an author connection graph.

In another embodiment, the present invention may comprise a system comprising a server having a processor, a memory and a recommendation program, the program stored in the memory and executable by the processor, the system in electronic communication over a network with remote client devices and adapted to make publisher recommendations and further comprising: an input adapted to electronically receive from a remote client device via a network an electronic document representing an unpublished article; means for analyzing a set of information associated with the unpublished article, the set of information including bibliography information, the means for analyzing being part of the program; means, responsive to the means for analyzing, for making a recommendation as to a set of at least one publication to which to submit the unpublished article for publication consideration; means for transmitting the recommendation via a network to the client device; means for receiving from the client device a signal responsive to the recommendation, the signal comprising information representing a selection of at least one publication from the set of at least one publication; and means for transmitting a file associated with the unpublished article to an electronic repository associated with the selected at least one publication. The set of information may further comprise one or more of a bibliography, an impact factor, a journal rank, a list of similar articles, an overall score, or a set of data relating to a set of rejected manuscripts of the journal. The overall score may be a match probability that is a composite score determined using both a nearest neighbor and fingerprint model. The set of information about the journal to which to submit the unpublished article may be presented via a display. The method may also further comprise generating an author connection graph.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 6, is a screen shot that illustrates aspects of the user interface for the manuscript recommending and submission system, specifically a set of journals from list of recommended journals.

FIG. 10, is a screen shot that illustrates aspects of the user interface for the manuscript recommending and submission system, specifically the interface for entering or modifying information associated with a manuscript for submission.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In accordance with the exemplary embodiments described herein, the present invention provides systems, and software for manuscript recommending and submission, and related methods, adapted to connect a manuscript's author with a social network of authors of published manuscripts.

Figure 1:
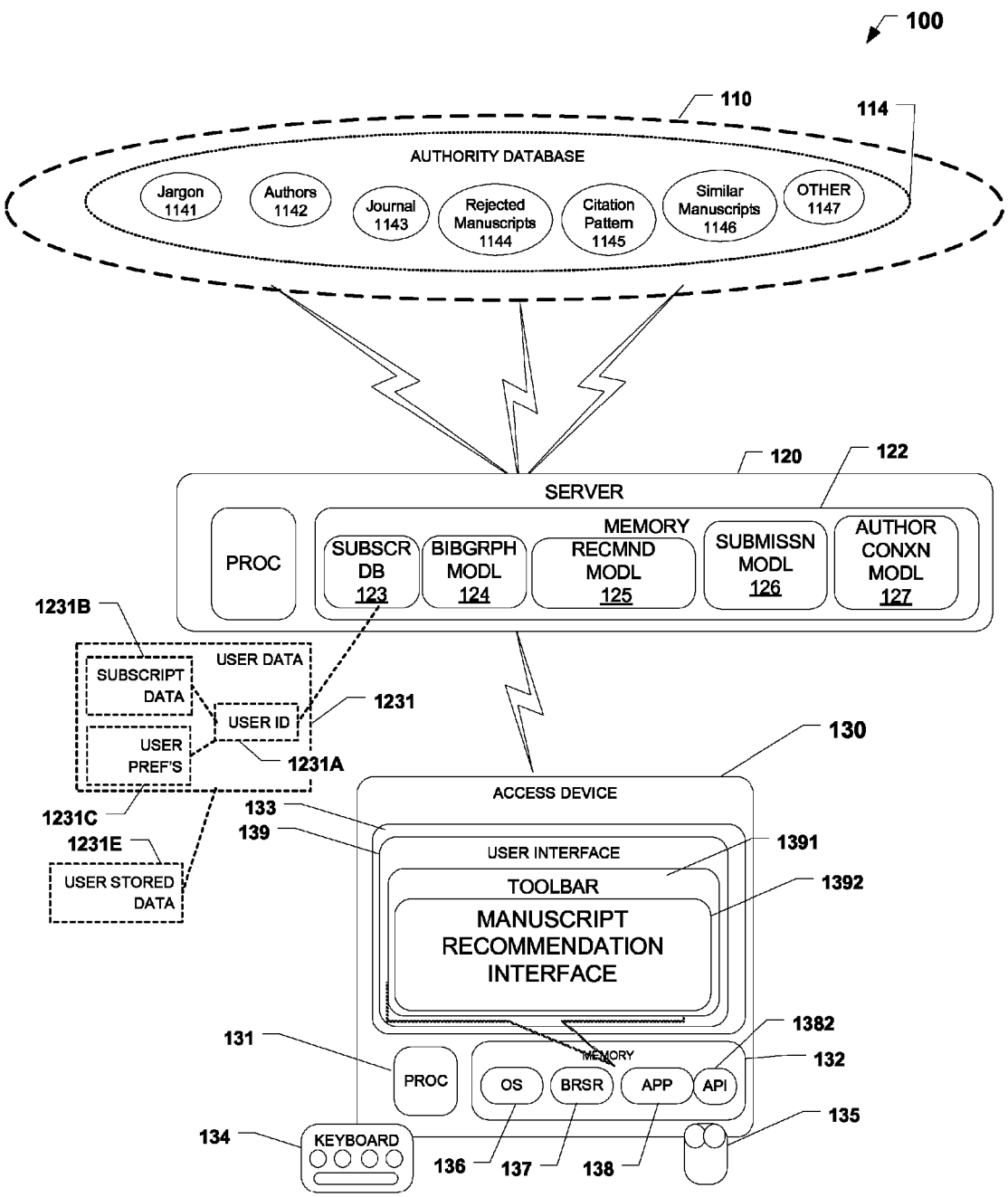
FIG. 1, is a block diagram illustrating one embodiment of the manuscript recommending and submission system architecture according to the present invention.

With reference now to FIG. 1, an exemplary manuscript recommending and submission system 100 is adapted to integrate with either or both of a central server or a client-operated processing system as depicted. System 100 includes one or more databases 110, one or more servers 120, and one or more access (e.g., client) devices 130.

In one implementation, the present invention is incorporated into the Thomson Reuters EndNote bibliography management system. As illustrated in FIG. 1, the manuscript recommending and submission system 100 includes database 110, server 120 and user interface 139 operating on access device 130. The user interface 139 is preferably a word processor such as Microsoft Word®. In this embodiment, the present invention analyzes an academic manuscript's bibliography and utilizes a full-text authority database 114 to identify journals or other publications as candidates for manuscript submission and to rank or determine by which entity the manuscript is best suited to be published.

Database 110 includes an authority database 114 and may also comprise additional databases (not shown) which may comprise a combination of internal, external, and/or third-party databases. The authority database 114 may include a jargon database 1141 of terms, words, and collocations, an author database 1142, a journal database 1143, a database of rejected manuscripts 1144, a citation pattern database 1145, a database of similar manuscripts 1146, and other databases 1147. The other databases may include databases of other publications and other sets of information that may be accessible for use by system 100 to identify a journal for manuscript submission.

In one example, the jargon database 1141 is comprised of terms, words, and collocations identified from a corpus of text. The manuscript recommending and submission system 100 is trained on a large corpus of papers from a set of journals. In each journal in the set of journals, the system looks for terms, words, and collocations that may be used to distinguish each journal from the other journals in the set of journals.

In one example, the authors database 1142 contains a database of authors, their published manuscripts, and the journals in which the manuscripts were published. The database also contains information including the topics, citations, and jargon used in the authors' manuscripts and profile or other information related to the author, e.g., institution/faculty history, co-authors, research, affiliations, etc. This information is used to establish and maintain a professional or a social network of authors. The social network of authors is used to find a "path" from a user to a journal's editor. This will provide a user/author seeking to publish a work with the ability to consult the network for a common connection related to prior publications relevant to publication of the manuscript. The present invention may provide this information in the form of a table, graph, or other visual representation to help the user find the information needed. Two or more authors may also be connected if they publish a paper together or are listed, for example, as co-authors on a paper. The connections and information provided by the social network of authors provides the user with a set of tools that enable the user to consult with relevant co-authors about submitting his or her paper to a certain journal. In this manner the system 100 may invoke "clusters" of relatedness helpful in getting a prospective manuscript publish. There are known methods for disambiguating data, for example, U.S. Pat. No. 7,953,724, issued May 31, 2011, and entitled METHOD AND SYSTEM FOR DISAMBIGUATING INFORMATIONAL OBJECTS, describes a Distinct Author Identification System for disambiguating data to discern author entities and link or associate authorships with such author entities and is incorporated herein by reference.

In one example, the journal database 1143 is a bibliographic or full-text database of scholarly journal articles and meta-data records. This database comprises the full text of articles published from a wide variety of journals and other publications and also includes additional information about the articles themselves. For example, the journal database 1143 may include information about the topics, authors, and citations used in the full-text articles. Examples of databases or data sources that may comprise the journal database 1143 include PubMed, Medline, Thomson Reuters Web of Knowledge (WoK) and Web of Science (WoS), Thomson Reuters Literature, Thomson Reuters Intellectual Property, Thomson Reuters Financial and Risk, Thomson Reuters Grants Database, Thomson Reuters One, Thomson Reuters Legal, and Google Scholar.

The rejected manuscripts database 1144 and similar manuscripts database 1146 may or may not include the full-text of the manuscripts included in the respective databases. In the rejected manuscripts database 1144, the database comprises a set of manuscripts that were rejected by various journals. The rejected manuscripts database 1144 may also include additional information or meta-data about the rejected manuscripts and may also contain additional supporting information as to why the manuscripts were rejected by a particular journal or other publication. The similar manuscripts database 1146 includes sets of similar manuscripts and meta-data about the similarities for each set. These sets of similar manuscripts and the information about the journals in which they were published may be used by the system to recommend one or more journals to the user for publication of the user's manuscript. The similarity of manuscripts may be determined by jargon or terms used and by the citations used in a manuscript. Two manuscripts that do not use similar terms or jargon may still be found to be similar if the papers share a common set of citations or other matching data or characteristics.

The citation pattern database 1145 includes information about common citation properties, namely authors and journals, in papers published in the same journals. For example, in one embodiment the present invention determines a set of authors that are commonly or frequently cited in a certain journal. A new manuscript that cites to authors in that set of authors has a higher likelihood of being matched to that particular journal.

One or more of the jargon database 1141, author database 1142, journal database 1143, database of rejected manuscripts 1144, citation pattern database 1145, database of similar manuscripts 1146, and other databases 1147 in the authority database 114 may be combined or may share common sets of information. For example, author database 1142 may include data from the set of author information in the journal database 1143 and may not be a separate database. Similarly, the rejected manuscripts database 1144 and similar manuscripts database 1146 may comprise sets of relation information for manuscripts contained in the journal database 1143.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for providing manuscript recommendation and submission functionality through one or more service modules to clients of various "thicknesses." More particularly, server 120 includes a processor module 121, a memory module 122, a subscriber database 123, a bibliography management module 124, a recommendation module 125, a submission module 126, and an author connection module 127. Processor module 121 includes one or more local or distributed processors, controllers, or virtual machines. Memory module 122, which takes the exemplary form of one or more non-transitory electronic, magnetic, or optical data-storage devices, stores subscriber database 123, bibliography management module 124, recommendation module 125, submission module 126, and author connection module 127. The bibliography management module 124 comprises a set of commands and functions for creating and managing the bibliographies for manuscripts. The recommendation module 125 comprises a set of commands and functions that implement one or more mechanisms or models for matching a manuscript to a "best fit" journal or scoring or ranking a set of candidate journals.

The methods employed by the recommendation module 124 may include a score per journal, a "nearest neighbor" model search, and a fingerprint model. The "nearest neighbor" models search for manuscripts similar to the input manuscript in a training set. This search method bases its score on the number of similar papers accepted and rejected to each journal, as well as their similarity score. Therefore, it is possible for a journal with only one very similar manuscript to get a higher score than another journal that has multiple papers of lower similarity. The fingerprint model attempts to identify characteristics common to many manuscripts in the same journal. The characteristics may include jargon, citations, citation patters, and authors. The scores generated by the fingerprint model represent the similarity between each journal fingerprint and the input manuscript. The score per journal is a combination of the output of the "nearest neighbor" and fingerprint models. For example, the score per journal is a number between 0 and 1 that represents the match probability for a particular journal for the input manuscript.

The submission module 126 provides for the submission of an input manuscript to one or more journals identified by the recommendation module 125. The submission module 126 allows a user to directly submit a manuscript to a journal's editing and review systems. The submission may be automatic or semi-automatic and enables the author to submit a manuscript for peer review and processing before formal publication.

Subscriber database 123 includes subscriber-related data for controlling, administering, and managing pay-as-you-go or subscription-based access of databases 110. In the exemplary embodiment, subscriber database 123a includes one or more user preference (or more generally user) data structures. In the exemplary embodiment, one or more aspects of the user data structure relate to user customization of various search and interface options stored as user stored data 1231. User data 1231 also includes user ID 1231A, subscription data 1231B, user preferences 1231C, and external user stored data 1231E. Primary assets module 124a includes one or more search engines and related user-interface components, for receiving and processing user queries against one or more of databases 110.

Still with reference to FIG. 1, access device 130, such as a client device, is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector 135. In the exemplary embodiment, processor module 131 takes any convenient or desirable form and includes one or more processors, processing circuits, or controllers. Coupled to processor module 131 is memory 132. Memory 132 stores code (machine-readable or executable instructions) for an operating system 136, a browser 137, and document processing software 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. Upon executing document processing software 138 by processor 131, a manuscript recommendation interface 1392 integrated into the graphical-user interface 139 of the document processing software 138 is defined in memory 132 and rendered or presented on display 133. Upon rendering, interface 139 presents data in association with one or more interactive control features (or user-interface elements) which is stored in memory as API 1382.

An exemplary user interface 139 is shown with user interface elements toolbar 1391, and manuscript recommendation interface 1392. Manuscript recommendation interface 1392 enables user selection of one or more journals from a generated list of recommended journals for the automatic or semi-automatic submission of the input manuscript. Customizable factors selectable by the user to be used in selecting the preferred journal from the list of recommended journals may be selected in the manuscript recommendation interface 1392. The user may also use manuscript recommendation interface 1392 to submit the input manuscript to a selected journal.

Figure 2:
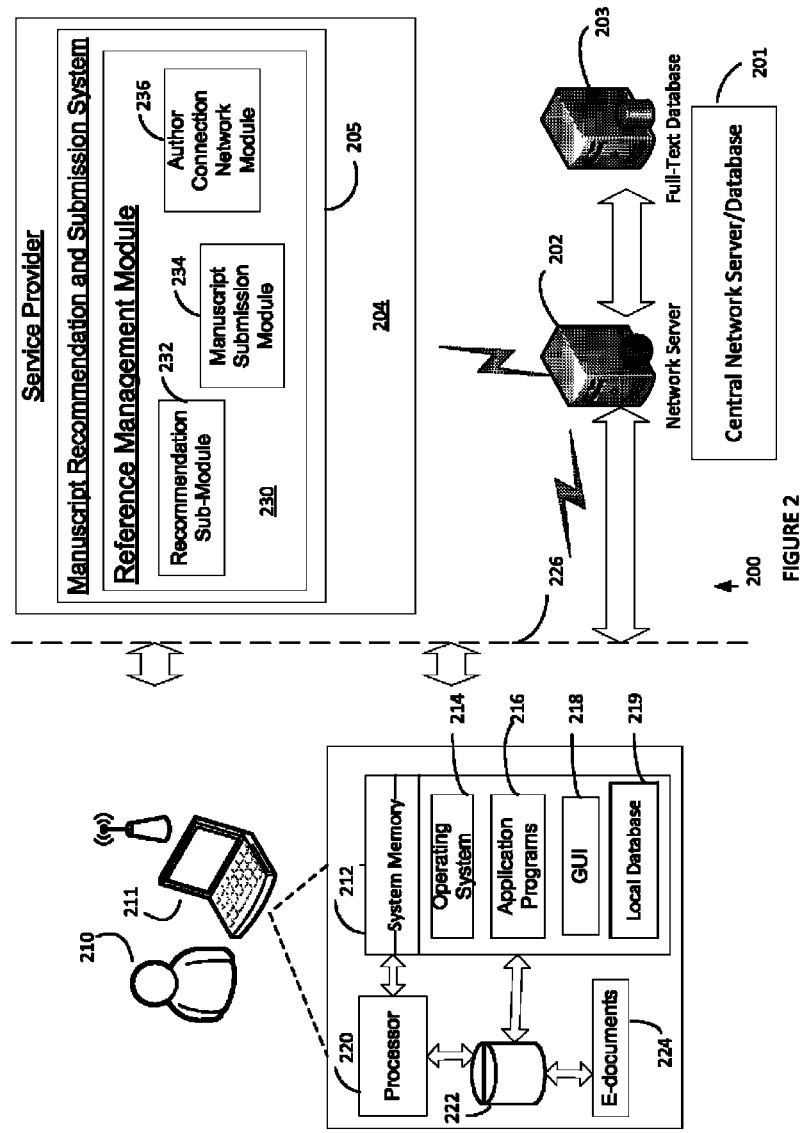
FIG. 2, is a block diagram illustrating one embodiment of the manuscript recommending and submission system architecture according to the present invention

FIG. 2 illustrates another representation of an exemplary manuscript recommendation system 200 for carrying out the herein described processes in conjunction with the combination of hardware and software and communications networking. In this example, manuscript recommendation system 200 provides a framework for recommending a journal for submission and for submitting an input manuscript. Manuscript recommendation system 200 may be used in conjunction with a service provider system 204 connected via network 226 to a remote access device 211 with functionality that may be integrated into one or more application programs 216 running on access device 211. Further, in this example, system 200 includes a Central Network Server/Database Facility 201 comprising a Network Server 202, a Database 203 of full-text manuscripts and journals, a manuscript recommendation and submission system 205 having as components a reference management module 230 which further comprises recommendation sub-module 232, manuscript submission module 234, and author connection network module 236.

The author connection network module 236 provides a social network of authors. This social network provides a user with a 'path' from the user seeking to publish a manuscript to a prospective publisher, e.g., a journal's editor, so that the user may consult with or benefit from a common connection (e.g., other author) regarding his manuscript. The system uses various machine learning techniques to compute the strength of the relation between every two authors. Once that map of relation strengths between authors is established, the system uses traditional path finding algorithms to identify optimal ways to connect an author to an editor in a journal. In one manner, the invention identifies a path and allows the author to connect to intermediate authors that can connect him to the editor (or otherwise facilitate communications with an editor) and advise him whether submitting his manuscript to the journal edited by the editor is a good decision.

The Central Facility 201 may be accessed by remote users 210, such as via a network 226, e.g., Internet. Aspects of the system 200 may be enabled using any combination of Internet or (World Wide) WEB-based, desktop-based, or application WEB-enabled components. The remote user system 210 in this example includes a GUI interface operated via a computer 211, such as a PC computer or the like, that may comprise a typical combination of hardware and software including, as shown in respect to computer 211, system memory 212, operating system 214, application programs 216, graphical user interface (GUI) 218, processor 220, and storage 222, which may contain electronic information 224 such as manuscripts, author information, journal information, and locally stored information from the full-text database 203.

The methods and systems of the present invention, described in detail hereafter, may be employed in providing remote users, such as researchers or other professionals, access to a manuscript recommendation and submission system 204. In particular, remote users may use the manuscript recommendation and submission system 204 to identify a set of "best fit" journals for an input manuscript. The system 204 may also be used to submit the input manuscript to one or more journals identified in the list of recommended journals. Client side application software may be stored on non-transitory machine-readable medium and comprising instructions executed, for example, by the processor 220 of computer 211, and presentation of web-based interface screens facilitate the interaction between user system 210 and central system 211, such as tools for further analyzing the data streams and other data and reports received via network 226 and stored locally or accessed remotely. The operating system 214 should be suitable for use with the system 201 and browser functionality described herein, for example, Microsoft Windows 8, Windows Vista (business, enterprise and ultimate editions), Windows 7, or Windows XP Professional with appropriate service packs. The system may require the remote user or client machines to be compatible with minimum threshold levels of processing capabilities, e.g., Intel i3, i5, i7, speed, e.g., 1-2 GHz, minimal memory levels and other parameters.

The configurations thus described are ones of many and are not limiting as to the invention. Central system 201 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 201 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 8I™, 10G™, or some other suitable database application may be used to manage the data. These tables may be organized into an RDS or Object Relational Data Schema (ORDS), as is known in the art.

Figure 3:
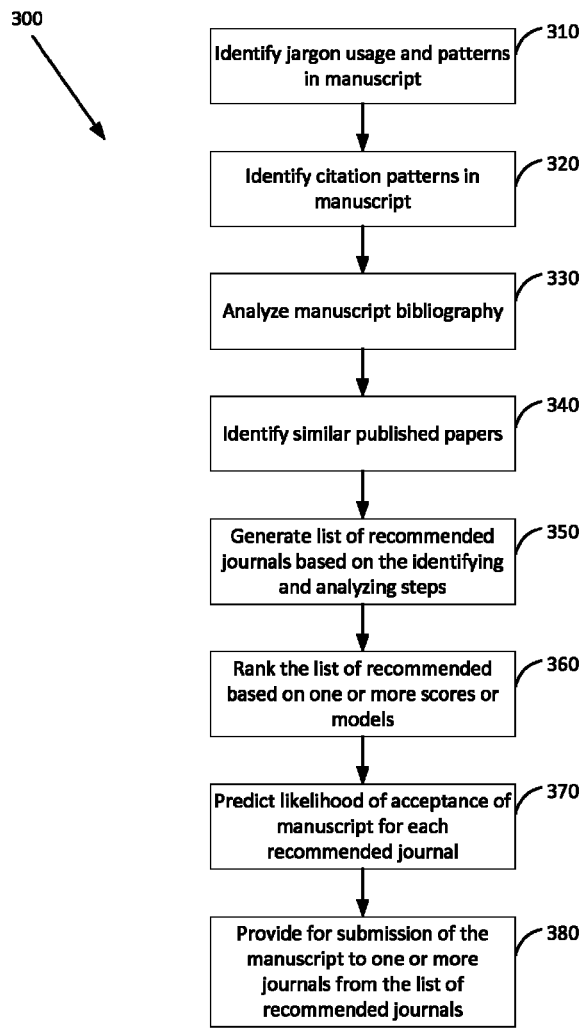
FIG. 3, is a flowchart illustrating the process of recommending journals and submitting a manuscript according to the present invention.

With reference now to FIG. 3, a flowchart illustrating an exemplary process 300 for of recommending journals and submitting a manuscript according to the present invention. In this embodiment, the manuscript recommending and submission module is integrated into bibliography management software that has been incorporated into a word processing software program. The bibliography management software may be, for example, Thomson Reuters EndNote®, and the word processing software may be Microsoft Word®. The user first creates the manuscript and uses the bibliography management software to create a bibliography of citations used in the manuscript. Once the bibliography has been created, the user may select the manuscript recommending and submission module from within the bibliography management software. The manuscript recommending and submission module may optionally first identify jargon usage and patterns in the manuscript in step 310 and identify citation patterns in the manuscript in step 320. However, these steps are not required by the process 300. In the preferred embodiment, the process of identifying one or more "best fit" journals begins in step 330. In step 330 the manuscript recommending and submission module analyzes the manuscript's bibliography, determines one or more scores, and identifies one or more factors to be used to rank journals from an authority database.

After the bibliography has been analyzed in step 330, the manuscript recommending and submission module may optionally identify one or more manuscripts from a set of manuscripts that are similar to the input manuscript in step 340. The recommending and submission module then identifies one or more journals to be included in a list of recommended journals for publication in step 350. To identify journals to be included in a list of recommended journals, step 350 may include one or more of a score per journal, a "nearest neighbor" model search, and a fingerprint model. The "nearest neighbor" model searches for manuscripts similar to the input manuscript in a training set. This search method bases its score on the number of similar papers accepted and rejected to each journal, as well as their similarity score. Therefore, it is possible for a journal with only one very similar manuscript to get a higher score than another journal that has multiple papers of lower similarity. The fingerprint model attempts to identify characteristics common to many manuscripts in the same journal. The characteristics may include jargon, citations, citation patters, and authors. The scores generated by the fingerprint model represent the similarity between each journal fingerprint and the input manuscript. The score per journal is a combination of the output of the "nearest neighbor" and fingerprint models. For example, the score per journal may be a number between 0 and 1 that represents the match probability for a particular journal for the input manuscript.

The manuscript recommending and submission module also uses sets of similar manuscripts, sets of manuscripts rejected by a particular journal, and additional supporting evidence when ranking and recommending journals for publication and submission. The supporting evidence may include terms or relevant categories from Wikipedia®. The Wikipedia terms are computed using a system that takes a piece of text and identifies the most relevant Wikipedia categories for the text. This system in turn uses a nearest neighbor approach. If the input paper shares relevant Wikipedia categories with many published papers of a journal, it can serve as human understandable evidence that the journal is likely a good match. In addition to Wikipedia categories, the system may also use domain specific categorizations and/or ontologies such as Medical Subject Headings (MeSH), Chemical Abstracts Service registry numbers, or proprietary vocabularies, e.g., Thomson Reuters Web of Science subject categories.

The manuscript recommending and submission module provides this information to the user and uses these sets of information to check, verify, or support the journal rankings in the list of recommended journals. The manuscript recommending and submission module may also use external information including relevant research and topic categories to further supplement the recommended journal list. These sets of information are also used to predict the acceptance probability of the input manuscript to a particular journal. In one embodiment, the system uses an SVM classifier to determine the likelihood of acceptance to a journal. For this part of the system, it is important that the classifier look at the entire academic paper and not only the paper's abstract. The positive examples used in the machine learning model are accepted papers to the journal and the negative examples are papers rejected from the journal. The access to a set of rejected papers here is critical as it more than doubles the set of data that can be used to determine the likelihood of acceptance over systems that only use a set of papers accepted by a journal. Citation data such as the cited authors and the cited journals serve as the most indicative machine learning features for the model. This model is used to predict the decision of a human reviewer that reviews the paper, and to identify papers that are likely to be accepted and papers that are likely to be rejected and can be extremely helpful. This additional information enables the user to not only know which journals are the best matches to the input manuscript, but also provides the user with information as to how likely the input manuscript is to be accepted for publication by a particular journal and which ones to avoid.

The list of recommended journals generated in step 350 is then ranked according to one or more scores or other factors in step 360. For example, the manuscript recommendation and submission system may consider the profile or ranking of journals or related institutions when generating a set of recommended journals for submission. Authors prefer to have their papers published by the most prestigious journals, which may influence the author's preference. The recommending and submission module will also provide the user with information as to how likely the input manuscript is to be accepted by any particular journal in step 370. The user may use this information to determine which journal from the set of recommended journals is the best option for publication of the manuscript. The recommending and submission module then provides the user with the ability to submit the input manuscript to one or more of the journals from the list of recommended journals in step 380.

Figure 4:
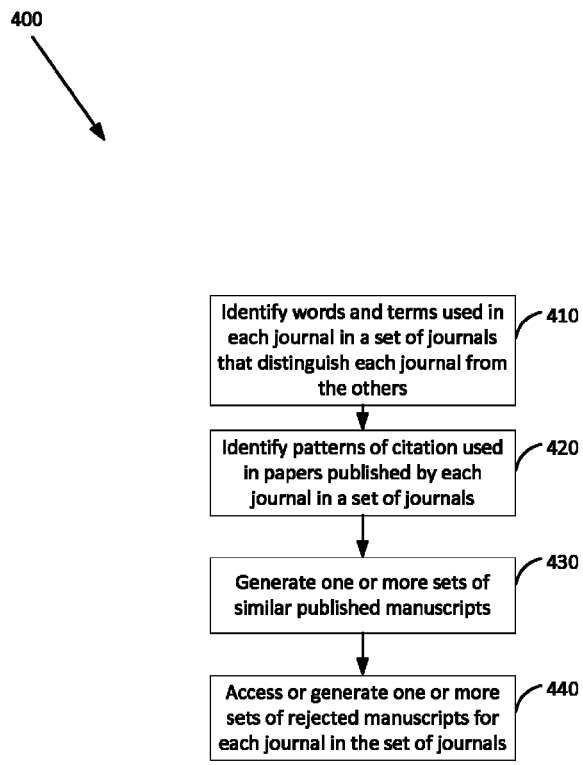
FIG. 4, is a flowchart illustrating the process of developing a set of information to be used in the process of recommending journals best suited for the publication of a manuscript.

With reference now to FIG. 4, a flowchart illustrates the process 400 of developing a set of information to be used in the process of recommending journals best suited for the publication of a manuscript. The additional information used by the manuscript recommending and submission system to determine which journals are to be included in a list of recommended journals for submission includes not only a set of full-text manuscripts from a variety of publications and journals, but also unique sets of information that are used to score journals, find similar manuscripts, find similar or linked authors, and find similar, rejected manuscripts. In step 410 the system is trained on a corpus of full-text documents from a number of journals and other publications. The step 410 involves identifying terms, words and collocations used in manuscripts published by individual journals that may be used to identify a particular journal. The unique patterns of these terms may be used as a set of identifying information for a journal and may be used to score a journal relative to an input manuscript. In one embodiment, this step involves training a machine learning model based on a support vector machine ("SVM") classifier. A separate model may be trained for each journal in a set of journals. The positive examples for the SVM classifier are papers previously accepted to the journal and the negative examples are papers that appeared in other journals. The machine learning features (indications) used for the classifier are the words that appear in the abstracts, words that appear in the title, the papers cited by the inputs paper, the authors of the cited papers, the journals in which the cited papers appeared in, and the output of different topical classifiers that are applied to the input paper.

The step 420 involves identifying patterns of citation in manuscripts published by individual journals that may be used to identify a particular journal. The unique citation patterns may be used as a set of identifying information for a journal and may be used to score a journal relative to an input manuscript.

The manuscript recommending and submission system will also generate one or more sets of similar published manuscripts in step 430 for individual journals. These sets of similar manuscripts may be compared to an input manuscript to determine if the input manuscript shares similar topics, authors, citations, or jargon with papers previously accepted by a particular journal(s). The sets of similar manuscripts may also be used to score or rank a journal relative to an input manuscript. In one embodiment, a "similar papers" identifier is implemented by indexing in a search system a set of academic papers which may be the full set of academic papers available through a service such as Thomson Reuters Web of Science and may include both rejected and accepted papers. Then, given an input paper, the system searches for the most similar papers in the index. This approach is called a nearest neighbor approach. The system applies information theoretic ideas similar to information gain and mutual information in order to perform the search efficiently. In order to find documents that are similar to the input document, the system makes use of a generic search system, to which the input document is fed as a search query. However, such a search query is typically very large and thus leads to inefficient behavior of the system. Hence, instead of submitting the entire input document as input, the system identifies only the words that are rich in information, and uses only these as the input to the search engine. The process of choosing these information-theoretic-rich words uses the information theoretic concepts of information gain and mutual information. The system then looks at the journals in which the similar papers were published or from which they were rejected. Similar papers accepted to a given journal serve as good evidence that the input paper might be a good match for that journal.

A set or sets of manuscripts comprised of manuscripts rejected from various journals is accessed or generated in step 440. The set or sets of manuscripts are used by the manuscript recommending and submission system to generate or improve recommendation results. Similar papers that were rejected from a journal also serve as an indication that the paper is likely to be relevant to that journal, since usually authors submit papers to relevant journals. However, the strength of this evidence may be weaker as the set of rejected papers also contain papers that ideally should have been submitted to a different journal. One clear advantage of the present system is the richness of information used to train the classifiers used by the system. The system is able to work with rejected papers in addition to accepted papers, and this more than doubles the amount papers available in the training set and allows the machine learning models to learn a very accurate model of the jargon used in each journal in the set of journals. However, some of the rejected papers for a given journal are very noisy, that is, they were rejected from the journal for one or more reasons which implies they cannot serve as typical examples for the language used in the journal. Additional processes may be used to address this and bolster the results. For example, to avoid incorporating this noise into the models used by the system, the system is first trained on an initial model to identify typical journal papers, and then rejected papers are removed from the training set which the model predicts to be very bad matches for the journal. This leaves the system with a clean and rich training set.

Figure 5:
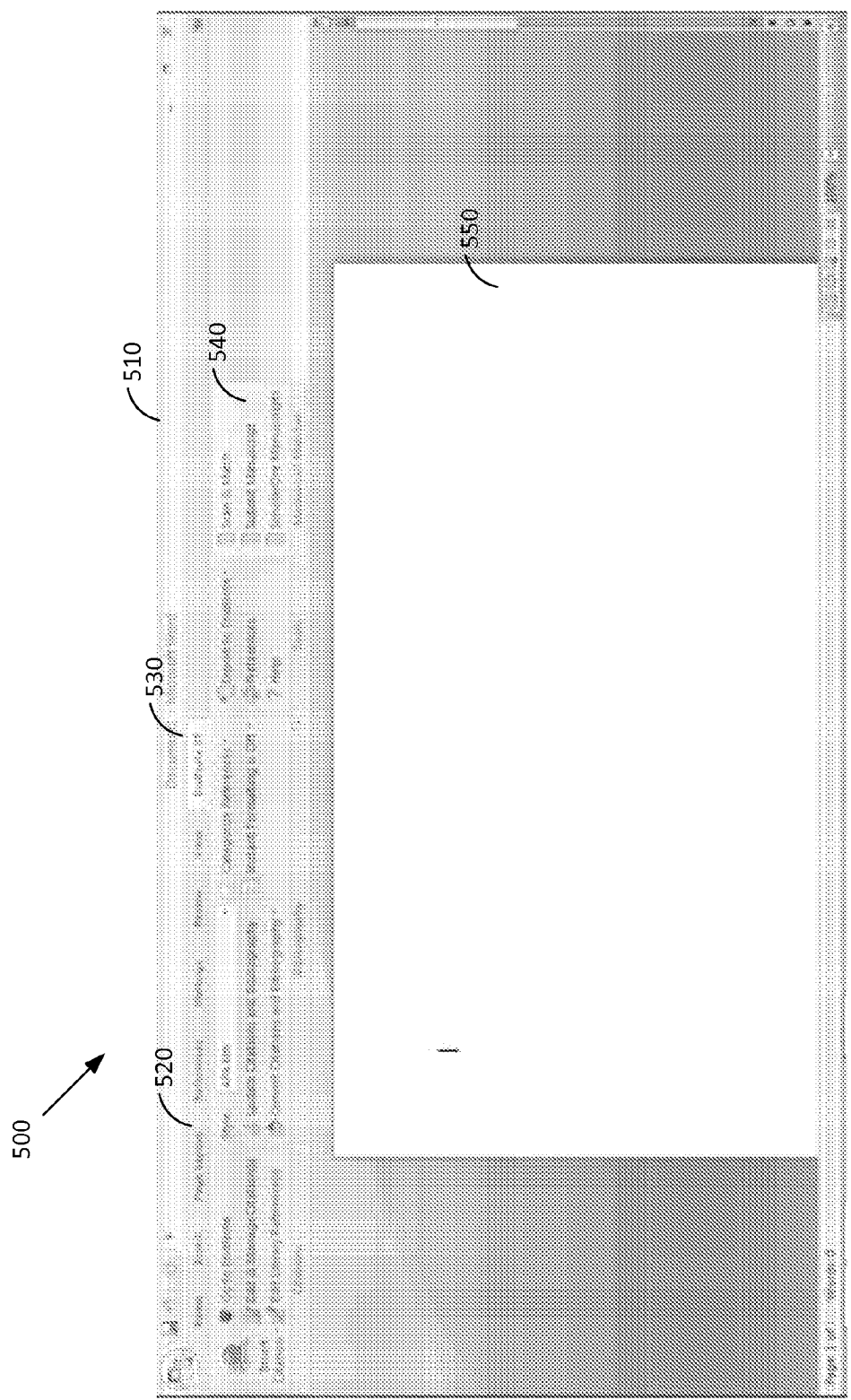
FIG. 5, is a screen shot that illustrates aspects of the user interface for the manuscript recommending and submission system as implemented in a bibliography management module integrated in word processing software according to the present invention.

With reference now to FIG. 5, user interface 500 for the manuscript recommending and submission module is shown as implemented in a bibliography management module integrated in word processing software operating on a client access device. In this embodiment, the user interface 500 comprises word processing software interface 510 including the document editing interface 550. A toolbar 520 is a standard feature of the word processing software interface 510. A bibliography management module 530 is integrated in the word processing software interface 510 as an additional option on toolbar 520. The bibliography management module 530 provides the user with tools and functions that may be used to create, manage, save and export a bibliography for a manuscript. The bibliography management module 530 may be, in one embodiment, implemented as Thomson Reuters EndNote®. The manuscript recommending and submission module 540 provides the user with the ability to scan the input manuscript's bibliography and find a set of "best match" journals for submission, submit the input manuscript to a selected journal, and view other manuscripts through a service such as ScholarOne Manuscripts.

Figure 6:
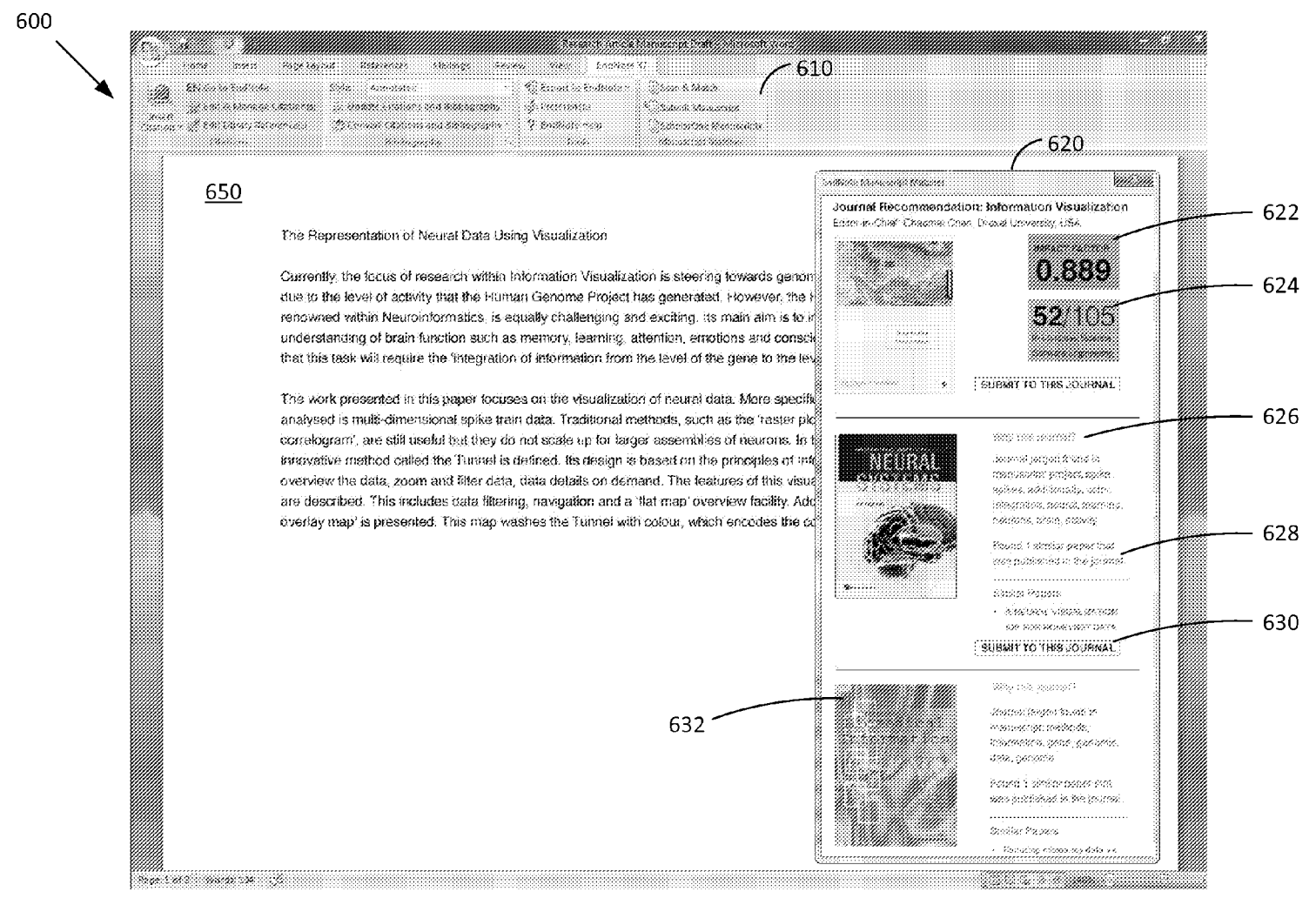

With reference now to FIG. 6, an exemplary screen shot illustrates the user interface 600 for the manuscript recommending and submission system, specifically a set of journals from list of recommended journals. In this embodiment, the user interface 600 is a word processing program such as Microsoft Word®. The manuscript recommending and submission module 610 is integrated into the EndNote X7 toolbar. In this screenshot, a manuscript that is shown in the document editor 650 was scanned or otherwise processed and matched with a set of recommended journals shown in recommended journals window 620. To generate the list of recommended journals a user may select the "Scan & Match" function from the manuscript recommending and submission module 610. The set of recommended journals in window 620 are originally ordered by closest match to the manuscript first, but may be re-ordered according to other criteria by the user.

When a journal in the recommended journals window 620 is selected, the user may see certain information about the journal including the name of the journal, information about the journal's editor, a recent cover for the journal such as cover 632, an impact factor 622, a journal rank 624, supporting information 626, list of similar journals 628, and submit button 630. The impact factor 522 for a journal is a generally accepted measure of overall journal quality. The impact factor 522 in this embodiment is a Thomson Reuters metric for the measurement of a journal's relative importance based on the average number of citations over a two year time span. Journals are ranked within specific subject disciplines (e.g., computer science, engineering) and impact factors can be compared within their discipline assignment. The impact factor 522 is presented to provide context for the recommended journal and to support the journal recommendation to the user/author. A user/author may decide to submit a manuscript to a journal with a higher impact factor even if the journal is ranked lower in the list of recommended journals. The journal rank 624 is the journal's rank within a category of journals, e.g. computer science and engineering. The supporting information 626 includes information that tells the user why a particular journal was selected for the list of recommended journals. The supporting information may include Wikipedia categories and other terms that were found in both the recommended journal and the manuscript. In addition to the supporting information 626, the user is also presented with a list of similar papers 628 that were accepted by the recommended journal. This list of similar papers 628 was also used to identify the recommended journal. The list 628 allows a user to locate papers that may contain similar terms, topics, citations, or authors. This information allows the user to make an intelligent decision when selecting a journal for manuscript submission. The submit button 630 allows a user to directly submit a manuscript to a journal's editing and review system and may also involve journal-specific or required formatting or other formalities. Alternatively, the submit button 630 may allow the user to email the manuscript directly to a journal's editor or email submission address.

Figure 7:
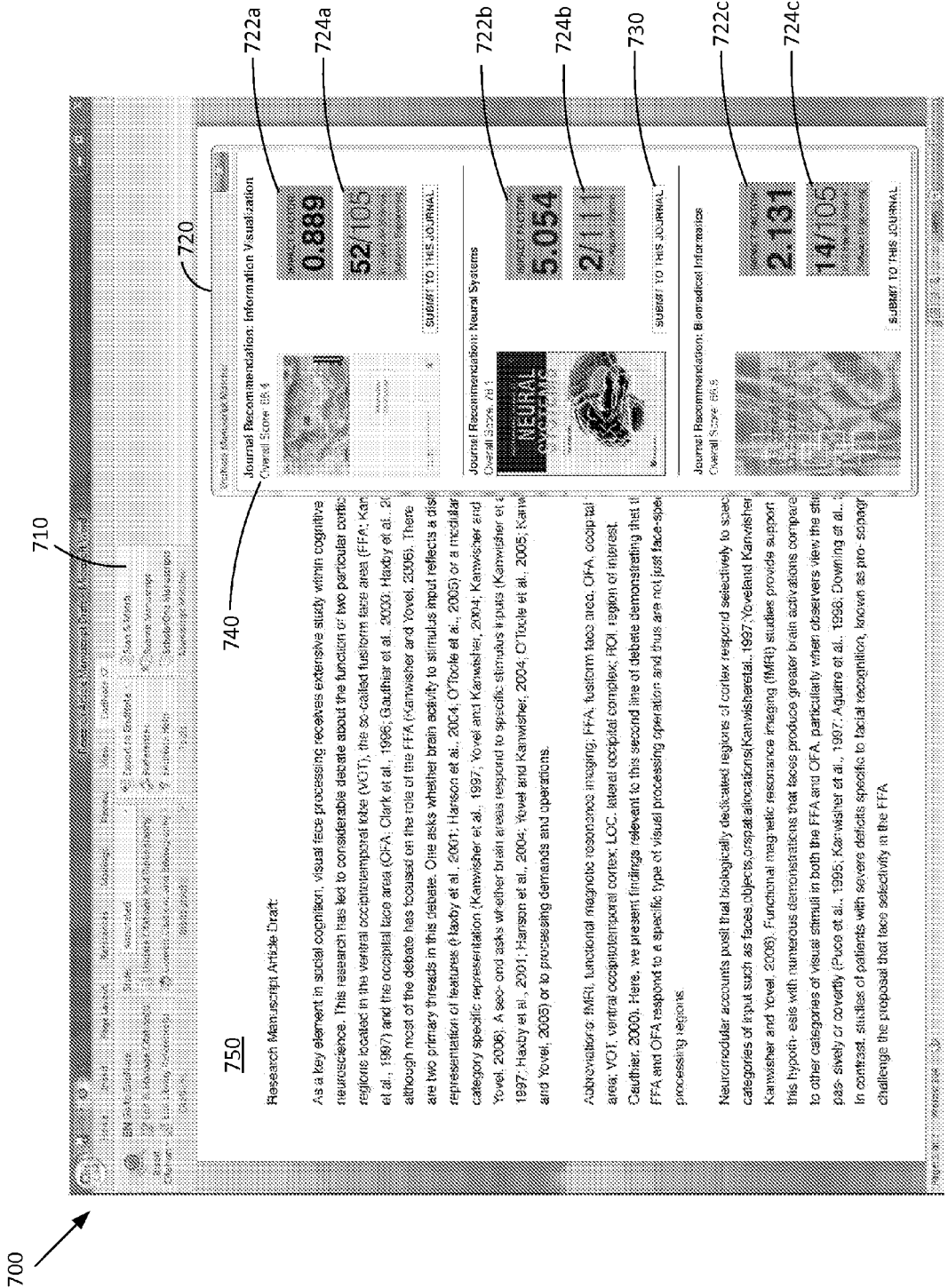
FIG. 7, is a screen shot that illustrates aspects of the user interface for the manuscript recommending and submission system, specifically a set of journals from a list of recommended journals and their respective scores.

With reference now to FIG. 7, an exemplary screen shot illustrates the user interface 700 for the manuscript recommending and submission system, specifically a set of journals from a list of recommended journals and their respective scores. In this embodiment, the user interface 700 is a word processing program such as Microsoft Word®. The manuscript recommending and submission module 710 is integrated into the EndNote X7 toolbar. In this screenshot, a manuscript that is shown in the document editor 750 was scanned and matched with a set of recommended journals shown in recommended journals window 720. To generate the list of recommended journals a user may select the "Scan & Match" function from the manuscript recommending and submission module 710.

The journals in the set of recommended journals window 720 are ordered by overall score. Journal 740 is the journal that the system identified as the closest match or "best fit" to the scanned manuscript. The journal 740 will be assigned a score. In one embodiment, the score may be an overall score that represents a "score per journal." The score per journal may be a value from −1 to 1, and may be presented to the user/author as a score from 0 to 100. The score per journal is a composite score that is determined using both a "nearest neighbor" model and a fingerprint model, and in FIG. 7 the journal 740 has an overall score of 86.4. Also shown are a set of impact factors 722a, 722b, and 722c. The impact factors 722a, 722b, and 722c are Thomson Reuters metrics for the measurement of a journal's relative importance based on the average number of citations over a two year time span. Below the impact factor for each journal in recommended journals window 720 are a set of journal ranks 724a, 724b, and 724c. The set of journal ranks 724a, 724b, and 724c indicate where each journal in the set of recommended journals ranks within a particular field of study.

Figure 8:
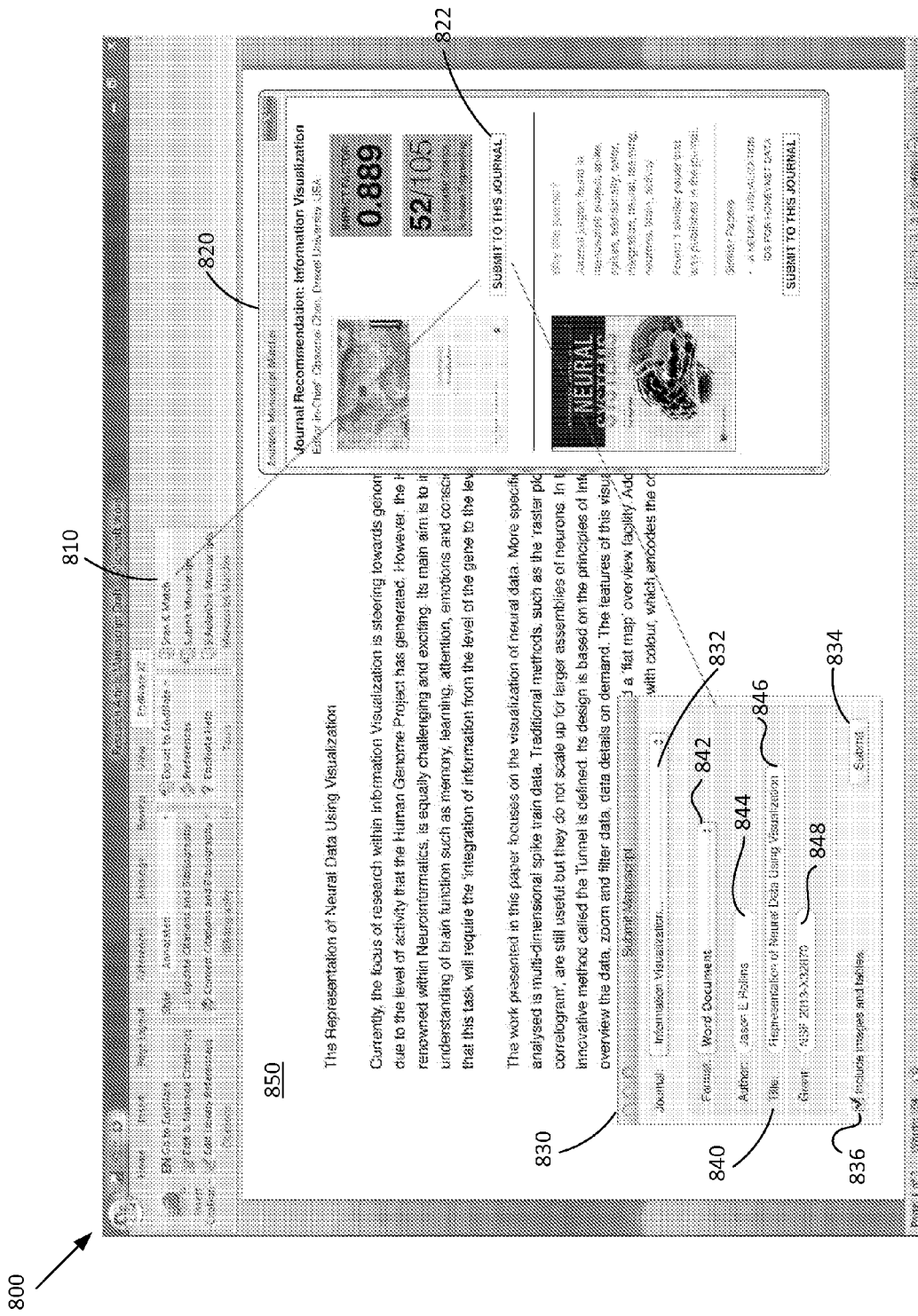
FIG. 8, is a screen shot that illustrates aspects of the user interface for the manuscript recommending and submission system, specifically the interface for submitting a manuscript to a selected journal.

With reference now to FIG. 8, an exemplary screen shot illustrates the user interface 800 for the manuscript recommending and submission system, specifically the interface for submitting a manuscript to a selected journal. To submit a manuscript such as the one shown in document editor 850 to a particular journal, a user first selects the "Scan & Match" function from the manuscript recommending and submission module 810. The "Scan & Match" function will identify one or more journals to be included in a set of recommended journals. The recommended journals are presented to the user in the recommended journals window 820. The user is presented with various information about a journal including the title, a recent cover, editor information, an overall score, an impact factor, and a journal rank within a particular field of study. The user is also presented with a submit button 822 labeled "SUBMIT TO THIS JOURNAL." If the user wishes to submit the manuscript to a particular journal, the user may click the submit button 822 or may select the journal and click the "Submit Manuscript" function in the manuscript recommending and submission module 810.

After the user has selected a journal and has chosen the submit journal function using either the manuscript recommending and submission module 810 or submit button 822, the user is presented with the manuscript submission interface 830. The manuscript submission interface 830 includes a journal selection drop-down menu 832 and document information section 840. If the user clicks the submit button 822 to open the manuscript submission interface 830, the journal selection drop down menu 832 is automatically populated with the name of the journal associated with the selected submit button 822. If the user instead opens the manuscript submission interface 830 using the "Submit Manuscript" function in the manuscript recommending and submission module 810, the user is presented with a list of journals to choose from in journal selection drop down menu 832 and must select a journal.

In the document information section 840 the user may enter or edit information about the manuscript to be submitted. The user may choose the format of the document using the format drop down menu 842, may enter the author name in the author name box 844, may enter the title of the manuscript in the title box 846, and may enter grant information in the grant information box 848. Alternatively these boxes may be automatically populated by the system when the manuscript is scanned to generate the list of recommended journals. The document format in the format drop down menu 842 may be automatically selected by the system based on the preferred document format for the journal selected in the journal selection drop-down menu 832. The user may also choose to either include or exclude any tables or images in the manuscript using the "include images and tables" check box 836. After the user has completed all fields in the manuscript submission interface 830, the user may submit the manuscript directly to the selected journal using the submit button 834.

Figure 9:
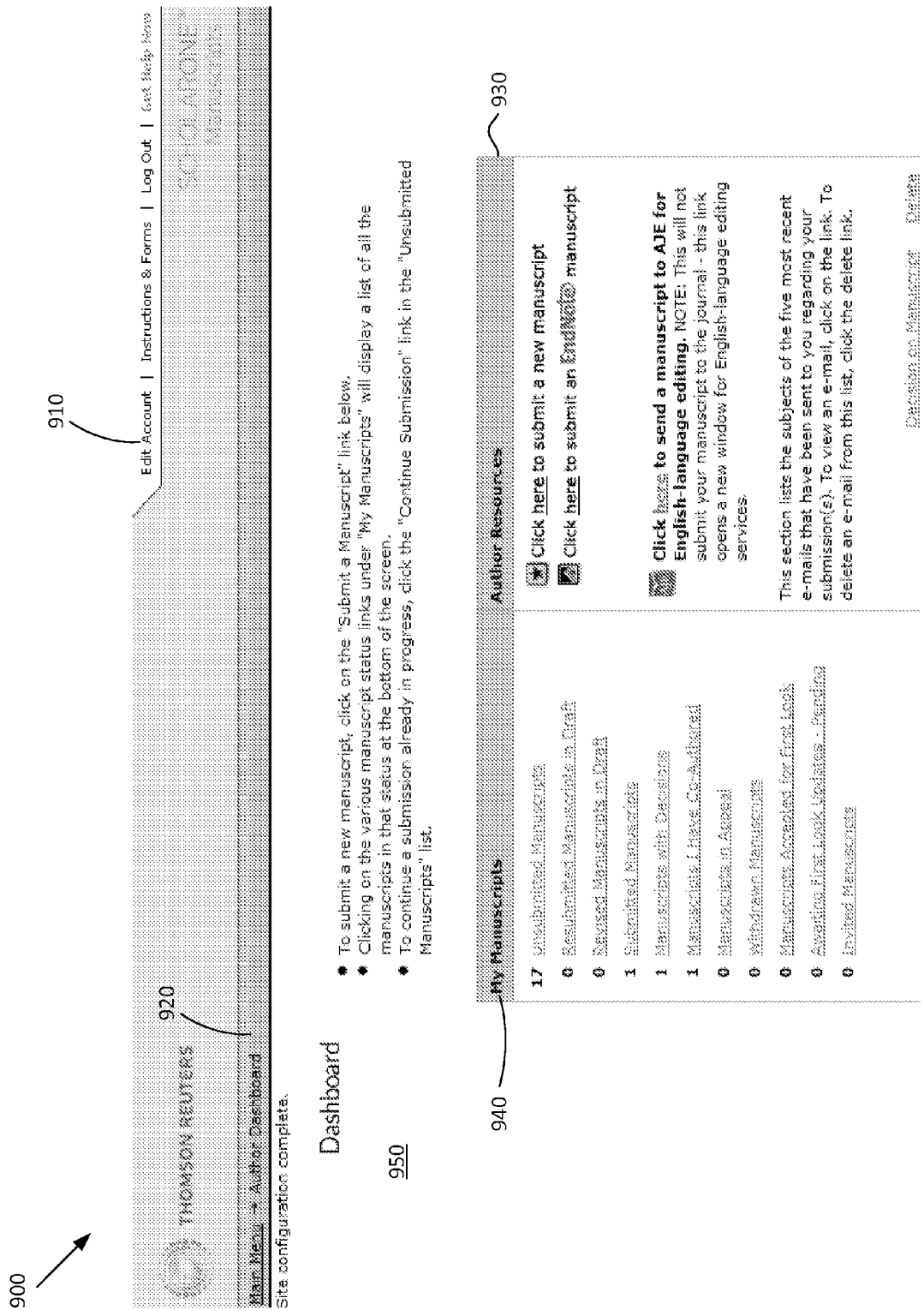
FIG. 9, is a screen shot that illustrates aspects of the user interface for the manuscript recommending and submission system, specifically the interface for viewing and managing manuscripts for submission to a publication.

With reference now to FIG. 9, an exemplary screen shot illustrates aspects of the user interface 900 for the manuscript recommending and submission system, specifically the Dashboard 950 for viewing and managing manuscripts for submission to a publication. The Dashboard 950 is accessed from a main submission menu. A navigation toolbar 920 shows the user/author where they are currently located in the manuscript recommending and submission system interface. A toolbar 910 located at the top of the interface provides the user with access to user account features, instructions & forms, and addition help and support features. The user interface 900 and Dashboard 950 may either be incorporated into word processing software or may be presented via a web browser. In another embodiment, the user interface 900 and Dashboard 950 may be a separate application associated with word processing software and manuscript recommendation and submission module 810 as shown in FIG. 8.

Still with reference to FIG. 9, the Dashboard 950 provides the user/author with access to tools that provide for the management and submission of manuscripts. In this example, the My Manuscripts toolset 940 comprises a set of tools for viewing and managing the author's manuscripts. The manuscripts are categorized by the current status of each manuscript. In this example, the author has 17 manuscripts that have not been submitted for publication, one manuscript that has been submitted for publication, one manuscript that has been reviewed by a publication, and one manuscript on which the user/author is a co-author. If the user/author selects any of the manuscript categories in the My Manuscripts toolset 940 the manuscripts in the corresponding category will be presented to the user along with a set of functions associated with that manuscript category. For example, if the user/author were to select the unsubmitted manuscripts option, the user would be able to submit a manuscript, view a manuscript, edit information about a manuscript, or remove the manuscript form the system. The Author Resources section 930 comprises a set of tools for submitting new manuscripts of different types, or other options related to a selected manuscript. The Author Resources section 930 provides contextual information and tools associated with the manuscript or manuscript category selected form the My Manuscripts toolset 940. The Author Resources section 930 may also present messages to the user/author or messages and/or information related to a particular manuscript.

Figure 10:
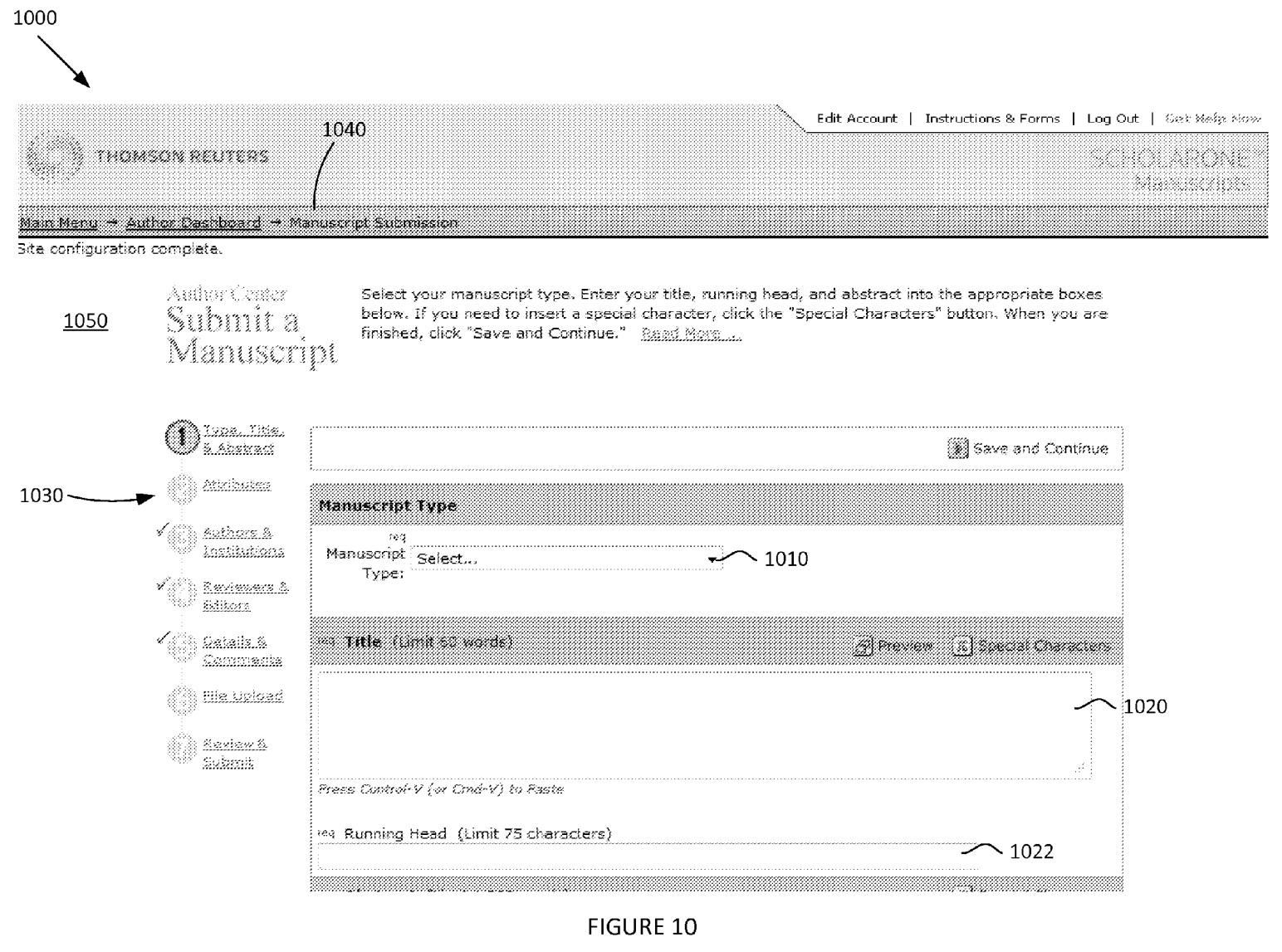

With reference now to FIG. 10, an exemplary screen shot illustrates aspects of the user interface 1000 for the manuscript recommending and submission system, specifically the interface for entering or modifying information associated with a manuscript for submission that would be presented to the user/author if the submit new manuscript option were chosen from the Author Resources section 930 as shown in FIG. 9. The Submit a Manuscript interface 1050 provides the user/author with a set of tools for inputting or editing information about a manuscript for submission to a journal or publication. The user/author is guided through a series of steps 1030 associated with the submission of a manuscript to a particular publication. The process begins with the user/author entering information about the manuscript to be submitted. The user/author first selects a manuscript type using the drop down box 1010. The manuscript type may also be automatically determined and the correct type automatically selected when the manuscript is scanned by the present invention. The user/author then enters the title in the title box 1020 and the running head for the manuscript in the running head box 1022. The user/author then enters additional information about the manuscript in the available corresponding fields. In one embodiment, all fields are automatically populated when the manuscript is scanned and the user/author need only verify or correct the information. The user is guided through the series of steps 1030 until all required information about the manuscript has been entered or verified and the manuscript is submitted. Some information may also be collected from a user profile associated with the user/author that may be common to all manuscripts for the particular user.

In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A method implemented on a computer comprising a memory, a processor, and a program stored in the memory, the method for making publisher recommendations and comprising:

a) accessing from the memory a word processing module for execution by the processor;

b) initializing the program via the word processing module, the program executed by the processor and comprising a bibliographic software module and a recommendation sub-module, the initializing permitting interaction among the bibliographic software module, the recommendation sub-module and the word processing module;

c) invoking the recommendation sub-module to automatically generate a set of at least one recommendation as to a publication to which to submit an unpublished article for publication consideration, the recommendation based upon an analysis of a set of information associated with the unpublished article, the set of information comprising a bibliography and an overall score, the overall score representing a match probability determined using at least one model selected from a group consisting of a nearest neighbor model and a fingerprint model;
d) storing the recommendation in the memory; and
e) transmitting a file associated with the unpublished article to an electronic repository associated with at least one publication from the set of at least one publication.

2. The method of claim 1 wherein the set of information comprises a set of data relating to a set of rejected manuscripts of the journal.

3. The method of claim 1 wherein the method further comprises presenting via a display the set of information about the journal to which to submit the unpublished article.

4. The method of claim 1 wherein the overall score is a match probability that is a composite score determined using both a nearest neighbor model and a fingerprint model.

5. The method of claim 1 wherein the set of information comprises an impact factor, a journal rank, and a list of similar articles.

6. The method of claim 1 wherein the method further comprises generating an author connection graph.

7. A system comprising a computer, the computer comprising a memory, a processor, and a program, the program stored in the memory and executable by the processor, the system comprising:
a) means for processing an electronic document representing an unpublished article;
b) means for analyzing a set of information associated with the unpublished article, the set of information associated with the unpublished article, the means for analyzing being part of the program, the set of information comprising a bibliography and an overall score, the overall score representing a match probability determined using at least one model selected from a group consisting of a nearest neighbor model and a fingerprint model;
c) means, responsive to the means for analyzing, for making a recommendation as to a set of at least one publication to which to submit the unpublished article for publication consideration;
d) means for transmitting the recommendation;
e) means for receiving a response to the recommendation; and
f) means, responsive to the means for receiving the response, for acting in accordance with the response.

8. The system of claim 7 wherein the set of information comprises a set of data relating to a set of rejected manuscripts of the journal.

9. The system of claim 7 wherein the system further comprises means for presenting via a display the set of information about the journal to which to submit the unpublished article.

10. The system of claim 7 wherein the overall score is a match probability that is a composite score determined using both a nearest neighbor model and a fingerprint model.

11. The system of claim 7 wherein the set of information comprises an impact factor, a journal rank, and a list of similar articles.

12. The system of claim 7 wherein the system further comprises means for generating an author connection graph.

13. A system comprising a server having a processor, a memory and a recommendation program, the program stored in the memory and executable by the processor, the system in electronic communication over a network with remote client devices and adapted to make publisher recommendations and further comprising:
a) an input adapted to electronically receive from a remote client device via a network an electronic document representing an unpublished article;
b) means for analyzing a set of information associated with the unpublished article, the set of information including bibliography information, the means for analyzing being part of the program, the set of information comprising an overall score, the overall score representing a match probability determined using at least one model selected from a group consisting of a nearest neighbor model and a fingerprint model;
c) means, responsive to the means for analyzing, for making a recommendation as to a set of at least one publication to which to submit the unpublished article for publication consideration;
d) means for transmitting the recommendation via a network to the client device;
e) means for receiving from the client device a signal responsive to the recommendation, the signal comprising information representing a selection of at least one publication from the set of at least one publication; and
f) means for transmitting a file associated with the unpublished article to an electronic repository associated with the selected at least one publication.

14. The system of claim 13 wherein the overall score is a match probability that is a composite score determined using both a nearest neighbor model and a fingerprint model.

15. The system of claim 13 wherein the set of information comprises an impact factor, a journal rank, and a list of similar articles.

16. The system of claim 13 wherein the system further comprises means for generating an author connection graph.

* * * * *